Oct. 18, 1955   D. M. LEITCH   2,721,046
VARIABLE DIHEDRAL MECHANISM FOR AIRCRAFT WINGS
Filed March 26, 1949   2 Sheets-Sheet 1
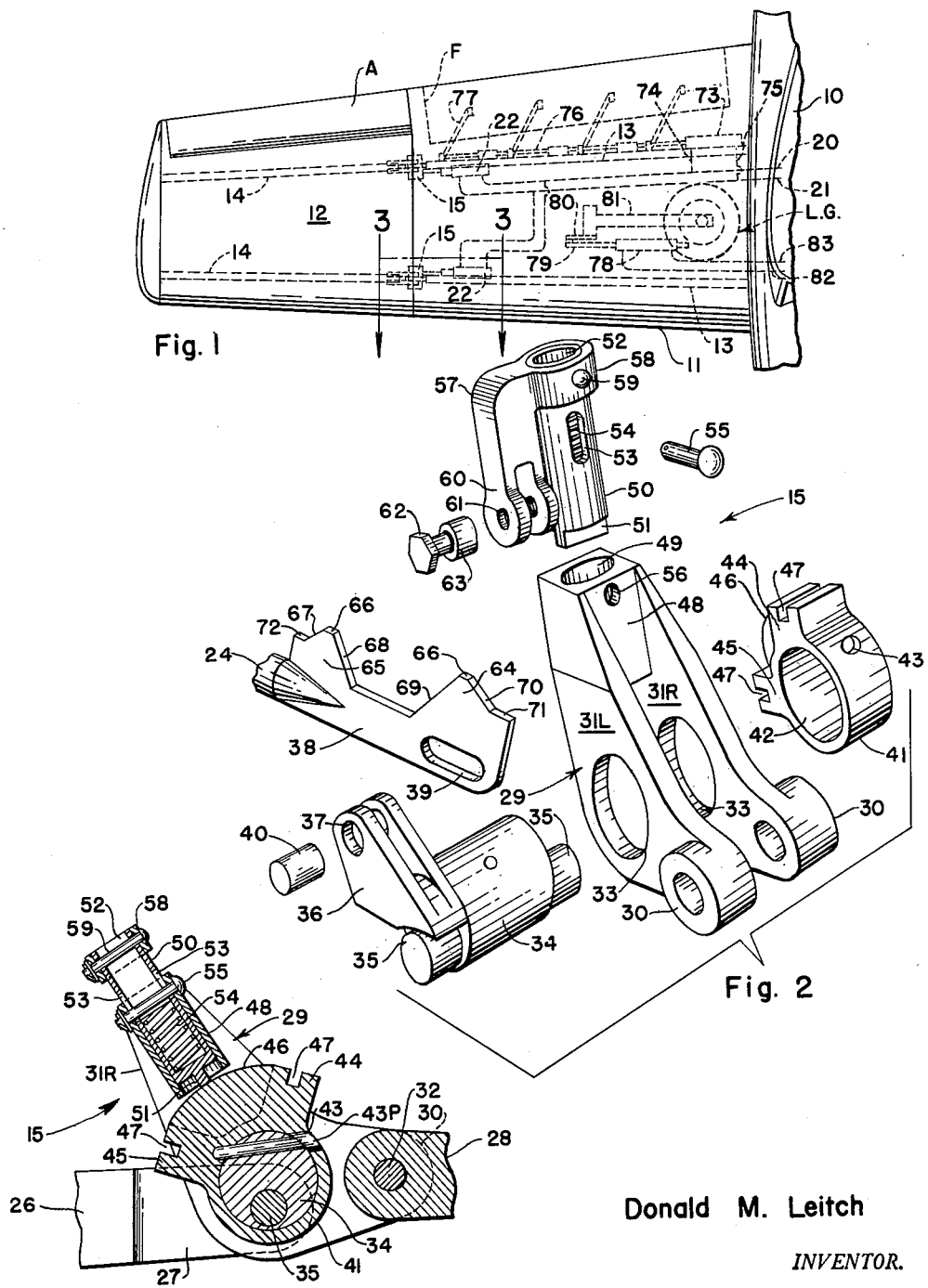
Donald M. Leitch
*INVENTOR.*
BY
HIS PATENT AGENT Oct. 18, 1955  D. M. LEITCH  2,721,046
VARIABLE DIHEDRAL MECHANISM FOR AIRCRAFT WINGS
Filed March 26, 1949  2 Sheets-Sheet 2
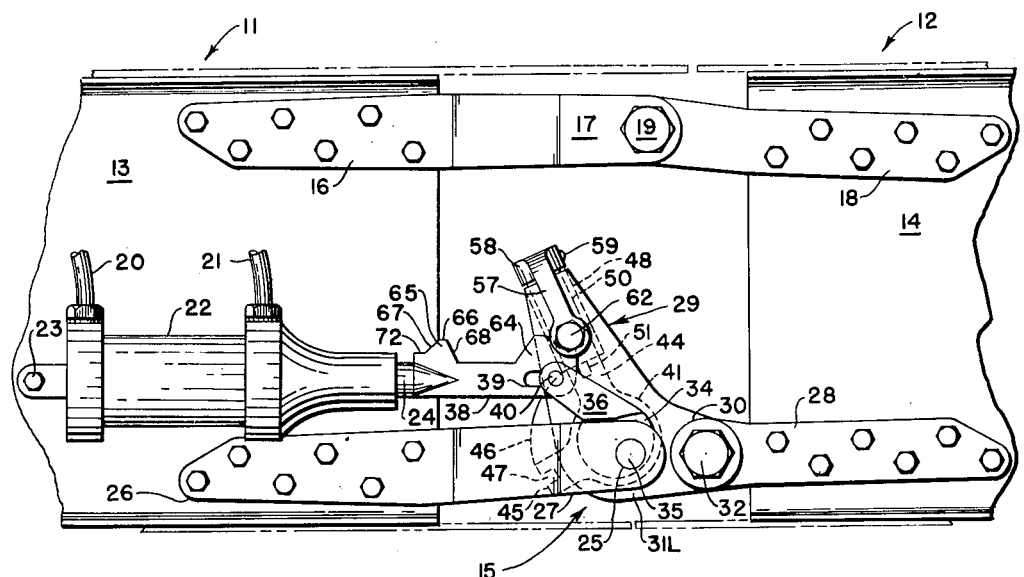
Fig. 3
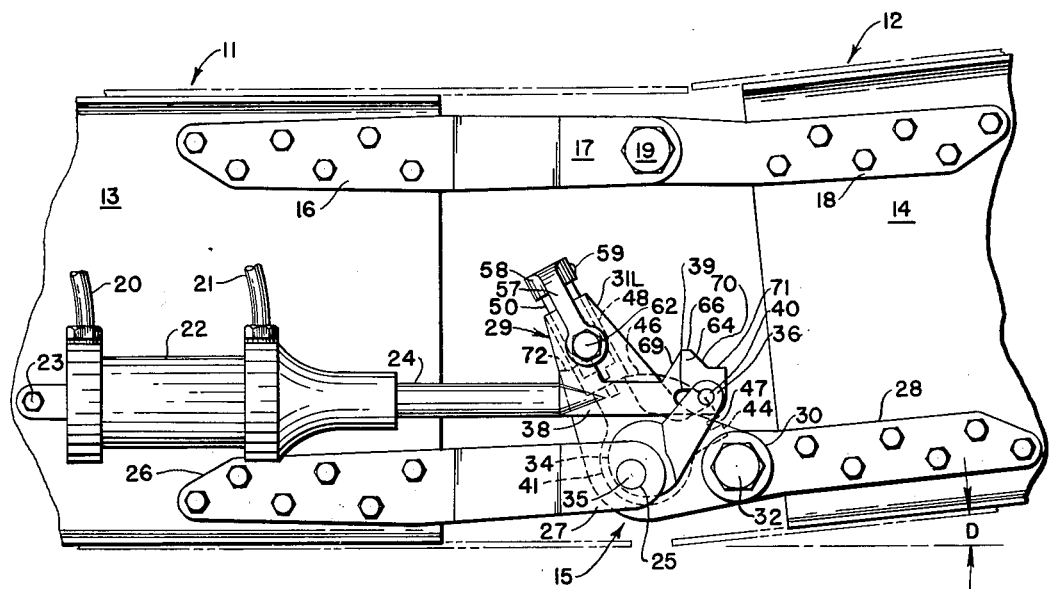
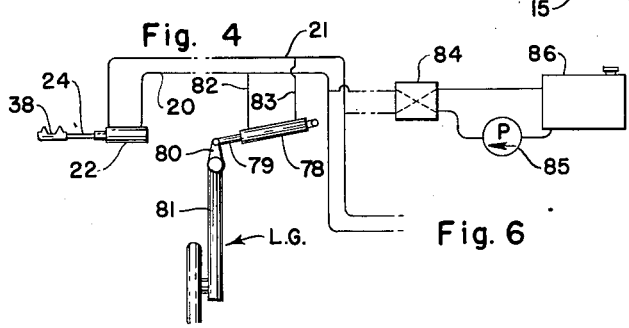
Fig. 4
Fig. 6
Donald M. Leitch
*INVENTOR.*
BY
HIS PATENT AGENT

United States Patent Office 2,721,046
Patented Oct. 18, 1955

2,721,046

VARIABLE DIHEDRAL MECHANISM FOR AIRCRAFT WINGS

Donald M. Leitch, Los Angeles, Calif., assignor to North American Aviation, Inc.

Application March 26, 1949, Serial No. 83,705

16 Claims. (Cl. 244—47)

The present invention relates to aircraft having wings of variable dihedral and is more particularly concerned with the problem of adapting the wing to permit a change of dihedral and of providing mechanism for accomplishing such a variation of dihedral angle.

The subject development is broadly an improvement stemming from the necessity of "building into" the airplane a certain and preferably optimum degree of lateral stability. This may be accomplished by the use of dihedral in the sustaining surfaces and, furthermore, as is now generally well known in the art, the incorporation of dihedral in these surfaces provides, for example, a means of obtaining control over the rolling moment in side slip. However, once a wing or sustaining surface has been designed and built, the dihedral angle of the opposite wing halves becomes a fixed quantity and the characteristics of the sustaining surface derived therefrom also become unvariable so far as the pilot of the airplane is concerned in his flight maneuvering of the craft. Where the choice is limited to but one of a number of possible amounts of dihedral, each preferable over the others under a particular combination of circumstances or conditions, the resulting choice must necessarily represent a compromise selected on the basis of yielding the best overall performance under all of those conditions likely to be met in the intended service. Under the conditions imposed by these facts, it is obvious that to be able to vary the amount of dihedral to more properly meet existing conditions is a desirable and advantageous improvement. For example, the problem which led to the present development existed in the recognized need of designing a high speed fighter type airplane capable of taking off from and of landing on aircraft carriers. On the one hand, such a ship must have a specified high-speed performance for combat service while on the other, it must incorporate satisfactory low speed characteristics to permit satisfactory landing under adverse conditions. Ordinarily, optimum performance characteristics at both extremes may not be expected since designs directed to the attainment thereof are somewhat incompatible but if the wing is capable of adjustment in flight, then the problem may be solved by accommodating the wing to the performance requirements met during succeeding stages of aircraft operation. While it is known that variable dihedral wings are disclosed in the prior art and that some show means for permitting movement of the sustaining surfaces for purposes of dihedral variation, yet many of these arrangements are not capable of adjustment in flight or for one reason or another have failed to be incorporated in installations contributing to the advancement of the practical art of aeronautics.

It is realized that the provision of variable dihedral in the sustaining surfaces adds another control which might normally further complicate the already greatly complex operation of modern aircraft. However it is conceived that the operation of varying the dihedral can be performed as an automatic function without attention by the pilot and to this end it is proposed that the operation of the dihedral varying mechanism be initiated by or caused to occur conjointly with the operation of some existing equipment which the pilot now must necessarily operate in flying the aircraft.

It is, accordingly, a principal object of this invention to provide a means for adjusting the dihedral angle of a sustaining airfoil, this means being operable at will by the pilot during flight.

Another important object is to provide for the automatic operation of the dihedral varying mechanism upon raising or lowering of the retractable landing gear, operation of the high lift flaps or other instrumentality which would lend itself to such conjoint operation being of a type which would normally be operated at such times or under such circumstances as would make it desirable that the dihedral of the wing also be varied.

A further object is to provide means capable of varying the dihedral angle of each half of the sustaining wing or similar surface or of the angle of outboard panels of the surface where such panels are hingedly attached to the inner fixed portion of the surface. As a matter of practice, such inboard fixed panels may be installed with an initial dihedral angle, in which case the other panel hinged thereto would be selectively adjustable as to its angularity with respect to the inboard panel so that a change would be effected, upon such adjustment taking place, of the overall or effective dihedral of the composite wing.

Another object is to provide mechanism of the character described which is positive in operation and which is capable of automatically locking itself in its adjusted position to provide a rigid structural connection which is adapted to transmit stresses from one structure to another which is linked thereto by the mechanism but which itself will not yield to such forces to permit unwanted relative movement between the structures which it connects.

A still further object is to provide a stress transmitting connection for a jointed structural member, the connector forming an effective part of the structure and at the same time providing a means for varying the relative positioning at the joints of the component parts of the structure.

Other objects and advantages will become apparent from a consideration of the detailed description which follows as a component part of the specification.

Referring to the drawings which are provided for illustrative purposes only:

Figure 1 is a plan view of a fragmentary portion of an airplane showing attached thereto one half of a jointed wing embodying my invention;

Figure 2 is an exploded perspective view of mechanism by which variation of dihedral is accomplished in the wing of Figure 1;

Figure 3 is a front elevational view of the joint in the main spar taken on the lines 3—3 of Figure 1;

Figure 4 is a view generally corresponding to Figure 3 but showing the parts in a different operated relationship;

Figure 5 is a part-sectional view of the subject mechanism in an intermediate stage of operation; and Figure 6 is a diagrammatic layout of an hydraulic system showing provision for operation of dihedral varying mechanism in conjunction with retractable landing gear.

By way of exemplification, the subject invention is shown incorporated in an airplane 10 having a monoplane type main sustaining surface in which each half wing comprises a fixed inner panel or root section 11 attached directly to the fuselage and to the outboard end of which is attached a relatively movable tip panel 12 as appears in Figure 1. The wing is equipped with a high lift flap F disposed in the undersurface at the trailing edge of the root section and may also have the usual lateral control surface A incorporated in the outboard panel. The flap F is of conventional type that may be operated in suitable guideways by power means which cause it to move downwardly and rearwardly to operative position. Also provided for the wing is a retractable landing gear unit LG of conventional type, this gear being shown as retractable upwardly and sidewardly into the wing by means of an actuator indicated as of hydraulic type. In Figure 1 are diagrammatically shown certain hydraulic lines and connections and these will be more fully described hereinafter following the description of the dihedral varying mechanism and its operation.

The wing is built around the usual fore and aft spars or other equivalent main strength members, the spar elements of the inboard panel being designated 13 while those of the outboard panel 12 are designated 14. The spar sections 14 are but extensions of the root or inboard sections 13 being separated from the latter by the gap necessary to form a joint in the wing which will permit a change of angularity between outboard panel 12 and inner panel 11 by which it is supported. This gap in which a hinge joint is formed is most apparent in Figures 3 and 4 and is sufficient to accommodate the mechanism 15 by which changes of dihedral are accomplished. A hinge joint of this character must be provided in each spanwise extending spar or equivalent and one or more mechanisms 15 employed for each wing element to be adjusted. As shown in Figure 1, an installation of a mechanism 15 is preferably made at each spar joint although it would be possible to install a dihedral varying mechanism at the mid-point of the wing between the spars or several could be installed at spaced points along the joint line.

At each spar joint as shown in Figures 3 and 4, a hinge connection is provided. It may consist of a hinge element 16 bolted or otherwise attached to the web of the spar 13. Its projecting end 17 is bifurcated and receives the oppositely projecting end of the hinge element 18 affixed to the web of spar 14. These two hinge elements are joined together by a bolt 19 to form a simple hinge of known construction.

In accomplishing an adjustment or change in the overall dihedral of the wing, as is done under the particular arrangement of wing elements disclosed in the accompanying drawings, the outer wing panel 12 is moved angularly with respect to the fixed inner wing panel 11 about the hinge axis running through the bolt 19. This angular movement is accomplished by the mechanism 15 by displacing the lower elements of the wing panel including the spars 14 outwardly and upwardly. The outer wing panel 12 is thus moved through an angular displacement which may be of the order of 5° as indicated by the angle D shown in Figure 4, although the range of angular movement is a matter of design choice. The dihedral varying mechanism 15 in the preferred form is of mechanical type and is actuated by remote control from the pilot cockpit, push-pull or double-acting type means being employed to transmit the control motion from the cockpit location outwardly through the wing to the hinge point. As shown, the transmission means may be of hydraulic type comprising fluid supply and return lines 20 and 21 which terminate at an expansible chamber, double-acting motor 22 of conventional type pivotally mounted as at 23 on suitable structure such as the spar element 13. Thus under the control of the pilot the motor may be actuated so that its piston and piston rod combination 24 may be retracted or extended as is apparent by the comparison of the relative positions in Figures 3 and 4. The reciprocating or push-pull movement of the piston rod 24 is utilized to accomplish the relative angular movement of the spar portion 14. As previously indicated, the spar elements 13 and 14 are tied together at their upper portions, adjacent to their respective flanges by the hinge connection 16—18—19 and it is of course necessary that the lower edges be rigidly interconnected at all times so that a proper transmission of stress can take place between the wing panel sections. Accordingly, a somewhat similar structural connection is employed at the lower portion of the spars and this comprises an element 26 formed generally in correspondence to the element 16, the same being bifurcated at the end 27 as best appears in Figure 5. This element 26 is attached to spar portion 13, while an element 28 is attached to the spar portion 14, this being generally similar to the upper hinge element 18. However, the elements 26 and 28 do not directly interconnect but terminate in such a way as to leave a gap between their oppositely projecting ends. This gap is bridged by the dihedral varying mechanism 15 which is adapted to vary the gap spacing to accomplish the dihedral variation of the wing.

The mechanism 15 comprises a main element 29 which is best shown in the detail of Figure 2. This is generally of an overall L-shape, having the lower arm of the L terminating in a pair of apertured bosses 30. These bosses are spaced although they lie on a common centerline and are integral with respective right and left hand side wall portions 31R and 31L of the element 29. The bosses 30 are adapted to straddle the apertured end of the element 28 and are pivotally joined thereto by means of a bolt 32.

The side wall portions 31R and 31L which are spaced in general parallelism have formed therein at the angle of the L relatively large apertures 33 which are arranged on a common centerline. These apertures are provided to receive a rotatable eccentric element 34 having a main body portion formed to enter the apertures 33 and extend from one side wall 31 to the other and having a bearing in the aperture 33 so that it can be rotated about its longitudinal axis. This element 34 has integral projections at either end, these being designated 35 and being also of a generally circular section although being offset from the longitudinal axis of the main portion 34. When the element 34 is in position in the main portion 29, the projecting studs 35 extend on either side of the side walls 31R and 31L, and are adapted to be received in opposed apertures 25 of the bifurcated end 27 of the element 26.

The element 34 has a third integral projection in the form of a bifurcated operating arm 36. Adjacent the ends of the furcations of this arm 36 are provided aligned apertures 37. This arm 36 is adapted to be actuated to rotate the element 34 as a result of movement of the piston rod 24. The rod 24 terminates in an extension comprising a slotted cam plate 38 which at its projecting end has a slot 39. The extension 38 fits between the furcations of the arm 36 and a pin or cross bolt 40 extends through the apertures in the arm portion and also through the slot 39 of the extension 38 to lock the two together although due to the slot 39 there is a predetermined degree of lost-motion in the connection in the direction transverse to the axis of pin 40. This lost-motion arrangement is provided for a purpose as will appear hereinafter.

As previously indicated, the main element 29 of the dihedral varying mechanism has spaced side plates 31R and 31L with the apertures 33 which receive the generally cylindrical element 34. In assembling the element 34, a member 41 is first placed between the side plates. This member 41 has a central bore 42 of the same diameter as the apertures 33 and when in position the axis of the bore and that of the apertures coincide. The member 34 when placed in proper assembled position extends through the apertures 33 and also the bore 42. The member 41 is then locked to the element 34 by a suitable means, for instance, by means of a locking pin 43P extending transversely of the element 34 being inserted in a small aperture 43 in the surface of element 41. Thus when element 34 is caused to be moved in rotation about the longitudinal axis of studs 35, the member 41 will be rotated therewith.

The sleeve member 41 is further characterized by a pair of radially projecting portions 44 and 45 of similar construction and these are integral with the main sleeve member and are spaced approximately 90° apart being further interconnected by a central web 46 of the integral material of the sleeve 41. This web is of part-circular section as is best shown in Fig. 5 and has its outer edge of a radius equal to the radius or radial dimension of the outer edges of the elements 44 and 45. Furthermore, the projecting elements 44 and 45 are each provided with transversely extending slots 47 preferably of rectangular section.

Returning to the main member 29, the side plates 31R and 31L which are spaced and otherwise unconnected are joined by an integral upper portion 48 located at the upper part of the vertical arm of the formation 29. This block 48 of generally rectangular section is machined to have a bore 49 extending downwardly therethrough. This bore is of circular section and is adapted to receive a plunger element 50 also of circular section and of a diameter sufficient to permit easy sliding up and down in the bore 49. The plunger 50 at its lower end terminates in an integral projection 51 extending transversely thereacross and adapted to enter either one of the slots 47 of the projections 44 or 45 of the sleeve 41 to lock the sleeve against relative movement when so engaged. The plunger 50 is solid at the bottom but is open at the top, there being a longitudinally extending bore 52 running downwardly therethrough. An opposed pair of side wall slots 53 is provided in the plunger 50 as best appears in Figures 2 and 5. Contained within the bore 52 is a coil spring 54 provided to urge the plunger downwardly so that it will be urged to enter one or the other of the slots 47 or else have the tip 51 riding along the peripheral edge of the disc portion 46 as appears in Figure 5.

When the plunger 50 is assembled in the bore 49, a retainer pin 55 is inserted in a transverse aperture 56 in the integral block 48 so as to extend therethrough and into and through the first slot 53 in the plunger 50 and over the top of the spring 54 which is partially compressed in the process. The pin 55 extends also through the second slot 53 and completely through the block 48 which has an opposite aperture corresponding to 56, the end of the pin being finally locked in place by a lockwire or the like. Due to the provision of the slots 53, the plunger 50 then moves up and down in the bore 49 being limited in its movement by the pin 55 and the relative length of the opposed slots 53.

Affixed to the upper end of the plunger 50, is an element 57 which is of a general L-shape having at the end of the shorter leg a collar-like formation 58 which receives the upper end of the plunger 50 and is locked thereto by a transverse pin 59, which extends through the collar portion from one side to the other and is held in place by a lockwire. The longer arm of the element 57 is designated 60 and terminates in a bifurcated portion having aligned apertures disposed on an axis extending at right angles to the longitudinal axis of the plunger 50. These apertures 61 are intended to receive a bolt 62 which supports a roller 63, the assembled relationship of the parts having the bolt extending through the apertures with the roller 63 located on the bolt between the bifurcations of the arm 60.

The roller 63 is a means of transmitting movement to the arm 57 to operate the plunger 50 upwardly in the direction of its longitudinal axis for the purpose of pulling the tip 51 out of either one of the apertures 47 of the sleeve 41 at such time as it is necessary to unlock the dihedral varying mechanism. The roller 63 is engaged by cam portions 64 and 65 of the cam strip 38 provided on the end of the piston rod 24. As appears in Figures 3 or 4 the extension 38 is so located as to pass between the furcations of arm portion 60 and thus come into contact with the roller 63. Also as appears in Figure 2 the cam portions 64 and 65 are integral with the extension 38 but are spaced at either end thereof; each comprising a high point 66 and cam slope approaches 67, 68, 69 and 70.

The operation of the dihedral varying mechanism is best understood from a consideration of Figures 3 to 5 inclusive. In Figure 3, the mechanism is shown in one of its extreme positions in which the outer movable wing panel 12 is in alignment with the fixed inner wing panel section 11. Assuming that the pilot wishes to vary the overall dihedral of the wing, he accordingly manipulates the pilot control within the cockpit to cause actuation of motor 22 which would then cause the piston rod 24 to begin to extend from the motor moving toward the right hand side of the figure. Due to the lost-motion or slotted connection between the cam extension 38 and the operating arm 36, relative motion occurs between the two members as the piston rod continues its movement. At the beginning of this movement, the roller 63 carried by the arm 57 rests upon level portion 71 of the cam element 64, the geometry of this arrangement being such that at this time the plunger 50 is in its lowermost position with its transverse tip 51 projecting fully into the transverse slot 47 of portion 44 of the sleeve 41. In this position, these parts are locked together and thus the sleeve 41 and the rotatable element 34 are prevented from undergoing rotational movement. However, as the movement of the cam extension 38 progresses, the upwardly sloping portion 70 of the cam strip contacts the roller 63 and being forced thereunder causes it to move upward along a path parallel to the longitudinal axis of the plunger 50. Due to the connection through the arm 57, the plunger 50 is caused to also move upwardly against the compression of the spring 54 contained therein. This upward movement of the plunger causes withdrawal of its transverse tip 51 from the slot 47 and when the right hand movement of the cam extension 38 progresses to the point where the roller rides up onto the flat top or highest portion 66 of cam element 64, then the plunger is at the upward limit of its movement and the tip is completely withdrawn from the slot 47 unlocking sleeve 41 and attached rotatable eccentric portion 34. At the same time, the limit of lost-motion in the connection between the extension 38 and operating lever 36 has been reached so that further movement to the right of extension 38 will be imparted through the pin 40 to the arm 36, which will cause rotation of element 34 about the axis of the projecting stud 35. Due to the fact that the longitudinal axis of the main body portion 34 is offset from the axis of rotation about which the surface 35 moves, rotation of 34 will act upon the side plates 31R and 31L of the main element 29 and cause a shifting of the same in the same direction as the movement of cam strip 38. As this motion continues, the tip 51 of the plunger is allowed to lower slightly until it contacts the disc portion 46 as in Figure 5, and as the portion 46 is of circular configuration at its edge, the plunger 50 is withheld temporarily in an intermediate outward position. This is so even though the flat portion 66 of the cam has lost contact with the roller 63 and the latter has moved down the initial part of back slope 69 and then after losing contact therewith has moved over into the space lying between the cam slopes 68 and 69 which define the clear space between the two cam portions 64 and 65. With the piston rod extended somewhere near to the mid-point of its movement, it is obvious that since the arm 36 is operating about a center within the studs 35, the piston rod 24 and its extension 38 will have to undergo a change of angularity and this is permitted by the pivotal mounting 23 of the motor. As the extending action of the motor is continued to adjacent the end limit of travel in the right hand direction, the tip 51 of the plunger rises off of the disc portion 46 due to engagement of roller 63 with back slope portion 68 and then after the roller passes over the highest cam point 66 of the cam portion 65, and down the slope 67, the plunger tip 51 is then lying over the slot 47 in the projection 45 and the action of spring 54 is such as to force the plunger down so that the tip enters the slot and locks the mechanism against further movement, except that due to the provision of slot 39, the motor is allowed a slight over-travel with respect to the rotatable member 34 so that the roller 63 is brought to rest upon the lowermost or level cam surface 72 of the cam element 65. Through this action the change of dihedral is accomplished, the distance between the axis of bolt 32 and of that of studs 35 being increased by the amount of throw of the rotatable eccentric portion 34. These points have thus been moved apart with consequent rotation of the outer wing panel about the hinge axis extending through bolt 19.

In order to return the wing to the minimum dihedral setting where the outer panel would again be aligned with the inner panel, the pilot would appropriately manipulate the control to restore the motor to the initial attitude wherein the piston rod would be retracted thereinto. During the initial leftward movement of the piston rod, the slot 39 would allow the movement without causing actuation of the arm 36 which of course is locked by the plunger 50. The roller 63 moves off of the cam portion 72 up the slope portion 67 and onto the flat top high-point 66 as is shown in Figure 4, at which time the end of lost-motion freedom between the cam extension 38 and the operating arm 36 is reached. Continued leftward movement of the piston rod would then begin to rotate arm 36 and consequently the eccentric rotatable element 34 with the plunger tip 51 again riding over the web portion 46 so that the plunger 50 is held out of locking position. The movement of the eccentric element causes leftward movement of member 29 which draws the bolt 32 leftward toward the axis of rotation lying in the studs 35 and as the movement progresses the roller 63 again makes contact with the back slope portion 69, rides up and over the high point 66 of cam portion 64 and then moves down the slope 70 to allow the spring 54 to again move the plunger into locking position. The roller 63 finally comes to rest on the lower cam surface 71 and the parts are again in locked attitude.

As has been previously indicated, the variable dihedral mechanism can be operated under the direct control of the pilot but in the interests of simplifying the demands on the pilot, it may be preferable in many instances not to have to operate an additional control for this purpose. Accordingly, the present invention provides also for automatic operation. Referring to Figure 1, the motors 22 for operating the dihedral mechanism have hydraulic lines 20 and 21 running thereto. These could connect into the usual hydraulic system as provided in aircraft to power the operation of the retractable landing gear, high lift flaps and other equipment. When so connected the line would run through a valve by means of which the pilot could control the operation separate from that of any of the other items of equipment. However in most instances, it would be more desirable to have these lines 20 and 21 connect directly into the hydraulic lines 74 and 75 leading to a motor 73 connected to operate the flap F. Thus whenever the flap is operated to the down position the hydraulic connections shown would also appropriately conduct the hydraulic pressure to the motors 22 to cause an increase of wing dihedral. The motor 73 has an extended piston rod 76 to which attach a number of pivotally connected links 77 which in turn pivotally attach to the flap F to impart motion thereto. The linkage shown is intended to represent any mechanism suitable for the purpose.

Still referring to Figure 1, there is shown a retractable landing gear unit LG equipped with a motor 78 which has hydraulic line connections 82 and 83. The operation of the dihedral varying mechanism could be tied-in to that of this landing gear rather than with that of the flap as previously described. In that case and referring more particularly to Figure 6, the hydraulic lines 82 and 83 connect respectively into the lines 20 and 21 leading from the motors 22. These lines lead to a conventional reversing control valve 84 connected in circuit with a pump 85 and reservoir 86. Thus with the gear extended as shown and when the valve 84 is correctly actuated, the motors 22 and 78 will receive pressure from the source. Motor 78 will extend its piston rod 79 which, acting on crank arm 80, will swing the landing gear strut 81 about its pivot to retract the gear. At the same time, the pressure will be applied to the lefthand end of motor 22 so that its piston rod 24 will be retracted and the wing dihedral reduced as a result. This figure shows only the motor and conduit installation existing on one side of the airplane but it is to be understood that a similar installation would exist in the opposite wing half and would use in common the source of pressure supply and control valve 84.

It is obvious that various changes or modifications can be made in the arrangement or design of the component parts and also that in order to vary the dihedral of the wing, it would be possible, instead of varying the overall dihedral by adjusting the angularity of an outer tip panel, to mount the entire right or left hand unitary wing panel by a hinge mounting at the fuselage connection and install at that point the dihedral varying mechanism which would then change the angularity of the wing as a whole. It should also be apparent that the variable dihedral mechanism constitutes an adjustable length stress transmitting structural link and it is capable of being used as such in other installations aside from a variable dihedral wing arrangement. It is comprehended that all such modifications and uses are within the scope of the present invention.

I claim:

1. A variable dihedral airfoil, comprising an airfoil portion angularly adjustable with respect to its mounting, a dihedral varying mechanism comprising a stress transmitting connection linking said airfoil portion to the mounting, lock means associated with said mechanism, cam means included in the dihedral varying mechanism adapted to vary the effective length of the said connection, power means for operating the dihedral varying mechanism, an operative connection interlinking the power means and the cam means, and an operative connection between the power means and the lock means for releasing the latter upon initial operation of the power means.

2. In a variable dihedral airfoil, an airfoil portion angularly adjustable with respect to its mounting, a dihedral varying mechanism comprising a continuously effective stress transmitting connection linking the mounting to said airfoil portion including cam means adapted to vary the effective length of said connection, means operatively connected to the cam means thereby adapted for actuating the dihedral varying mechanism to effect angular adjustment of the airfoil portion, and automatically operable lock means releasable by initial operation of the means for actuating the dihedral varying mechanism, the said lock means having operative connection to the means actuating the dihedral varying mechanism whereby it is adapted to be released and having further releasable connection with the dihedral varying mechanism whereby it is adapted to normally prevent actuation of the said mechanism.

3. In a variable dihedral airfoil, an airfoil portion angularly adjustable with respect to its mounting, a variable length mechanism constituting a continuously effective stress transmitting connection linking the mounting to said airfoil portion, eccentric cam means included in said mechanism to effect angular adjustment of the airfoil portion, power means, a lost-motion connection between said power means and said eccentric cam means, lock mechanism acting to retain said cam means in an adjusted position, and linkage operatively connecting the power means and the lock mechanism, said lost-motion connection being effective to permit the power means to first release the lock mechanism prior to actuating the eccentric cam means.

4. In an aircraft structure consisting of two portions, a continuously effective stress transmitting link of variable length comprising a first connection to one portion of said structure, a cam element rotatably supported through said first connection, a second connection to the other portion of said structure in permanent operative connection with the cam element, power means for operating the cam element, a lost motion connection operatively linking the cam element to the power means, lock mechanism normally adapted to prevent rotation of the cam element, and an operative connection from the power means to the lock mechanism adapted to cause release of the lock mechanism upon operation of said power means.

5. In a jointed aircraft structure, stress transmitting members bridging the joint including a continuously effective stress transmitting link of variable length comprising a first connection attached to at least one of said members, a cam element rotatably supported through said first connection, a second connection attached to others of said members, this second connection also having operative linkage to the said cam element, means for operating the cam element, an operative connection of lost motion type between the said means and the cam element organized such that initial operation of the said means within the limits of lost motion will not operate the cam, lock mechanism adapted to control movements of the cam element, and an operative connection between the said means and the lock mechanism whereby the lock mechanism is normally effective to lock the stress transmitting link against change of length but is releasable upon initial operation of said means.

6. In a jointed aircraft structure, stress transmitting members including a continuously effective stress transmitting link of variable length comprising a first connection to one of said members, an eccentric cam element rotatably supported through said first connection, a second connection to others of said members, the said second connection providing pivotal support for an intermediate member, the intermediate member being formed to rotatably receive the eccentric cam element, lock mechanism carried by the intermediate member and adapted to releasably lock the eccentric cam element in its adjusted position, means including a lost-motion connection for operating the cam element in rotation, the said means being initially effective to releasably actuate the lock mechanism prior to causing actuation of the cam element and means for holding the lock mechanism out of operation during rotational movement of the cam element.

7. A variable length mechanism for use as a link between two members, a main body element having a transverse bore extending therethrough, a connector joining the body element to one of said members, a rotatable eccentric receivable in the transverse bore, means in rotative association with the eccentric defining one or more locking positions of the eccentric, locking mechanism carried by the body element releasably engageable with said means, an operating connection to the rotatable eccentric effective to actuate the lock mechanism, and a second connector extending from the other of said members to a pivotal connection with the rotatable eccentric.

8. In a variable length mechanism for use as a link between two members, a main body element having a transverse bore extending therethrough, a connector joining the body element to one of said members, a rotatable eccentric receivable in the transverse bore, means in rotative association with the eccentric defining one or more locking positions of the eccentric, locking mechanism carried by the body element releasably engageable with said means, a second connector extending from the other of said members to a pivotal connection with the rotatable eccentric, an operating connection having a lost-motion connection to the rotatable eccentric adapted to rotate the eccentric about the axis of pivotal connection to the other of said members, and means provided on the operating connection engageable with the locking mechanism to effect unlocking thereof during initial movement of the operating connection.

9. In a variable length mechanism for use as a link between two members, a main body element having a transverse bore extending therethrough, a connector joining the body element to one of said members, a rotatable eccentric operable in the transverse bore, radially directed means associated with the eccentric defining one or more locking positions of the eccentric, a reciprocal lock element housed in the said means to be movable in a radial direction to engage said radially directed means to lock the variable length mechanism, a power driven connection to the rotatable eccentric having secondary operative connection to cause reciprocative movement of the lock element, and a second connector extending from the other of said members to a pivotal connection with the rotatable eccentric.

10. In a variable dihedral airfoil installation in an aircraft having a movable appendage, an airfoil portion angularly adjustable with respect to its mounting, a variable length mechanism as defined in claim 7 operatively connected to the airfoil portion, and common power supply means for simultaneously actuating said variable length mechanism and for moving said appendage between limit positions.

11. In a jointed aircraft structure, the combination of stress transmitting members including a continuously effective stress transmitting link of variable length bridging the joint having a first connection to at least one of said members, an adjustable spacing member attached to said first connection, a second connection to others of said members, this second connection also having attachment to said spacing member, means for operating the spacing member whereby the spatial relation between the first and second connections will be varied, an operative connection joining the said means to the spacing member, lock mechanism adapted to control adjustment of the spacing member, and an operative connection between the said means and the lock mechanism adapted to cause the lock to be automatically released upon initial operation of said means.

12. In a variable dihedral airfoil including a fixed root wing part and an adjustable wing part, the combination of a two-element adjustable connection bridging the gap between the parts and having structural connections to each part; the first element providing an axis about which the adjustable wing part may pivot, the second element being spaced from the first and comprising a variable length structural link adapted to control angular movement of the adjustable wing part about the axis including a cam-like member adaped to vary the spatial relationship of the ends of the link; power means operable to actuate the cam-like member; means adapted to transmit power from the power means to the cam-like member; and lock mechanism adapted to retain the cam-like member in adjusted positions.

13. In a variable dihedral airfoil including an inner fixed wing part and an outer movable wing part, the combination of: a hinge connecting the said wing parts together located near one face thereof so that the said movable wing part may be moved from a position substantially in alignment with the fixed wing part to an angularly adjusted position; a dihedral varying mechanism comprising a continuously effective stress transmitting connection extending between and located adjacent the other face of said wing parts; eccentric means incorporated in said mechanism to effect relative angular movement of the wing parts; power means for actuating the dihedral varying mechanism; a lost motion connection between said power means and said eccentric means; lock mechanism adapted to retain the dihedral varying mechanism in one or more of its adjusted positions; and an operating linkage connected to the said power means adapted to automatically release the lock as the result of initial operation of the power means, said lost motion connection being effective to permit the initial operation of the power means prior to actuation of the eccentric means.

14. In a variable arrangement airfoil, the combination of an airfoil portion angularly adjustable with respect to its mounting, a variable length mechanism constituting a continuously effective stress transmitting connection linking the mounting to said airfoil portion, means included in said mechanism to effect angular adjustment of the airfoil portion, an actuator, a lost-motion connection between said actuator and said means, lock mechanism acting to retain said means in an adjusted position, and an operative connection adapted to transmit power from the actuator to the lock mechanism, said lost-motion connection being effective to permit the actuator to first release the lock mechanism prior to actuating the variable length mechanism through its connection to said means.

15. In a variable dihedral airfoil including a relatively fixed first airfoil part and a second airfoil part adjustable with respect thereto, the combination of an adjustable connection joining the airfoil parts and adapted to serve as a structural bridge between the parts, the said adjustable connection providing a hinge axis about which the second airfoil part may pivot, the adjustable connection further providing a variable length link adapted to effect angular movement of the second airfoil part about the hinge axis including mechanism to vary the spatial relationship of the ends of the link, power means operable to actuate the said mechanism and power transmission means adapted to operably interconnect the power means and the said mechanism and to retain the mechanism in adjusted positions.

16. In a variable dihedral installation in an aircraft having a movable appendage, an airfoil portion angularly adjustable with respect to its mounting, a dihedral varying mechanism comprising a stress transmitting connection linking said airfoil portion to the mounting, lock means associated with said mechanism, cam means included in the dihedral varying mechanism adapted to vary the effective length of the said connection, power means adapted to simultaneously actuate said dihedral varying mechanism and to move the appendage between limit positions, operative connections linking the power means to the cam means and to the appendage, and an operative connection between the power means and the lock means for releasing the latter upon initial operation of the power means.

References Cited in the file of this patent

UNITED STATES PATENTS

| | | |
|---|---|---|
| 833,994 | Bradshaw | Oct. 23, 1906 |
| 1,547,181 | Myers | July 28, 1925 |
| 1,710,670 | Bonney | Apr. 23, 1929 |
| 1,834,858 | Metzler | Dec. 1, 1931 |
| 2,011,254 | Nightingale | Aug. 13, 1935 |
| 2,075,787 | Adams | Apr. 6, 1937 |
| 2,386,288 | Blaylock | Oct. 9, 1945 |
| 2,418,301 | Heal | Apr. 1, 1947 |
| 2,436,079 | Shipp | Feb. 17, 1948 |
| 2,473,792 | Fontaine | June 21, 1949 |